United States Patent

Fortin et al.

[11] Patent Number: 5,878,263
[45] Date of Patent: Mar. 2, 1999

[54] INTERNAL CHAINING TECHNIQUE FOR FIXUP RECORDS

[75] Inventors: Michael Richard Fortin, Austin; Maher Afif Saba, Round Rock, both of Tex.

[73] Assignee: International Business Machines Corporation, Armonk, N.Y.

[21] Appl. No.: 810,783

[22] Filed: Mar. 5, 1997

[51] Int. Cl.$^6$ ..................................................... G06F 9/445
[52] U.S. Cl. .......................................... 395/710; 395/712
[58] Field of Search ..................................... 395/710, 712

[56] References Cited

U.S. PATENT DOCUMENTS

| | | | |
|---|---|---|---|
| 5,297,291 | 3/1994 | Murphy | 395/685 |
| 5,408,665 | 4/1995 | Fitzgerald | 395/710 |
| 5,437,006 | 7/1995 | Turski | 707/503 |
| 5,526,485 | 6/1996 | Brodsky | 395/183.14 |
| 5,530,858 | 6/1996 | Stanley et al. | 395/677 |
| 5,548,759 | 8/1996 | Lipe | 707/100 |
| 5,708,811 | 1/1998 | Arendt et al. | 395/712 |

OTHER PUBLICATIONS

Harry Tennant, "Linking and Loading," Bits and Pieces, Byte Books, Blaise W. Liffick, Editor, vol. 4, 1979, pp. 77–87.

*Primary Examiner*—Paul V. Kulik
*Attorney, Agent, or Firm*—Mark E. McBurney; Jack V. Musgrove; Andrew J. Dillon

[57] ABSTRACT

A method of indexing memory addresses associated with objects in a program file. In the prior art, a file has a single fixup record section which contains information necessary to determine memory addresses once the file is loaded onto the computer system. In the present invention, the fixup records are located within pages defined in the program file (e.g., data or text pages), and the fixup records are chained, that is, a given fixup record is based on a previous fixup record. In this manner, the overall size of the file is significantly reduced by reducing the collective size of all of the fixup records.

13 Claims, 4 Drawing Sheets

INTERNAL CHAINING TECHNIQUE FOR FIXUP RECORDS

BACKGROUND OF THE INVENTION

1. Field of the Invention

The present invention generally relates to computer systems, and more particularly to a method of indexing memory addresses in a computer program file.

2. Description of the Related Art

The basic structure of a conventional computer system 10 is shown in FIG. 1. The heart of computer system 10 is a central processing unit (CPU) or processor 12 which is connected to several peripheral devices, including input/output (I/0) devices 14 (such as a display monitor and keyboard) for the user interface, a permanent memory device 16 (such as a hard disk or floppy diskette) for storing the computer's operating system and user programs, and a temporary memory device 18 (such as random access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor, and a memory controller may be used as an interface between temporary memory device 18 and processor 12. Computer system 10 also includes firmware 24 whose primary purpose is to seek out and load an operating system from one of the peripherals (usually permanent memory device 16) whenever the computer is first turned on.

With further reference to FIG. 2, when a user program runs on a computer, the computer's operating system (OS) first loads the main program file 26 into temporary memory 18. Program file 26 includes several objects (values) stored as data or text, and instructions for handling the data and other parameters which may be input during program execution. Processor 12 uses "logical addresses" to access the file objects, and these logical addresses correspond to physical addresses in RAM 18. "Binding" of instructions and data to physical memory addresses is accomplished by compiling the program file using relocatable code, which is indexed (linked) to physical memory by the OS loader during loading of the file. Thus, even though the address space of memory 18 begins at location zero, the first address of the user program is not necessarily zero, which allows a user process to reside in any part of physical memory.

The data and instructions in a given file are usually divided up into "pages" which are sized to fit more efficiently in memory 18. As processes are loaded and removed from memory, the free areas of memory space becomes broken up, or fragmented. Often there is enough free memory to load a process, but the free memory is not contiguous. Paging allows a process to occupy such non-contiguous memory spaces. A logical address is then divided into two parts: a page number and a page offset. The page number is indexed in a page table which contains the base address of each page in physical memory, and this base address is combined with the page offset to determine the actual physical memory address of the object. The size of a page depends upon the particular hardware platform, with a 2 or 4 kilobyte (KB) size being common.

If a program is particularly complicated, or if it requires a large amount of data or text, it is desirable to break up the program into multiple files so as to obtain better memory space utilization. One such approach involves the use of dynamically linked libraries (DLLs). The main program file 26 which is always loaded first for a particular user program is referred to as an "executable" file. The executable file can then call routines in DLL files 28 and 30. A "stub" is included in the executable file for each DLL routine reference. When the routine is called, the stub replaces itself with the address of the routine in the newly loaded DLL file. In this manner, all processes that require a particular library routine use only one copy of the library code, eliminating duplication of the library on both the hard disk 16 as well as in main memory 18. The use of DLLs has other advantages, such as easy library updating (e.g., for bug fixes). Without dynamic linking, all programs referencing the library would need to be relinked to use the updated library, but this is not required with a DLL since linking is postponed until execution time.

References between objects within a single DLL or executable file are problematic because the linker cannot determine the run time addresses of these objects unless they have been based. As a result, the linker deposits internal "fixup" records 32, 34, 36 within the executable or DLL file image. The OS loader is then responsible for reading the fixup records at load time and applying the necessary fixup information as individual DLL or executable pages are paged-in. Internal fixups can be removed from the fixup section of these files (referred to as LX files) if the executable or DLL file is based, i.e., marked to be loaded at a specific virtual address. Unfortunately, the DLL or executable file cannot be so loaded if the specified virtual address is unavailable (i.e., another file has already been loaded at that address). Very few DLL files are based because they are usually loaded at shared addresses. Many executables are based because they can be loaded at private virtual addresses. In addition to internal fixups, there are also external fixups. External fixups pertain to references spanning multiple DLLs and/or executables.

Internal fixups are read in at load time and stored in a pageable kernel data structure. Fixup sections of LX files can be quite large, typically 20 KB to 100 KB, but fixup records as large as 750 KB are not unheard of. This size is clearly undesirable as it increases permanent memory space requirements as well as complicating memory management. In addition to being read in at load time, the pageable fixup structures are indexed each time a corresponding page is faulted into memory. The indexing of these structures can result in page faults and increases the overall system working set. It would, therefore, be desirable and advantageous to devise a method of indexing memory address information in LX files without using excessively large fixup records.

SUMMARY OF THE INVENTION

It is therefore one object of the present invention to provide an improved method of indexing memory addresses in a computer program file.

It is another object of the present invention to provide such a method which is usable with executable files or dynamically linked libraries.

It is yet another object of the present invention to provide such a method which reduces the size of fixup records associated with objects in the file.

The foregoing objects are achieved in a method of indexing a plurality of memory addresses associated with objects in a computer program file, generally comprising the steps of defining at least a first page in the program file, the page including at least two objects, computing a first memory address associated with a first object located in the page, writing to the file a first fixup record for indexing the first memory address of the first object, computing a second memory address associated with a second object located in the page, and writing to the page a second fixup record for indexing the second memory address of the second object. The second fixup record is computed based on the first fixup record. This technique can be extended to any number of pages and objects in the file, e.g., the program file can include a second page having at least one object, and the method would further comprise the steps of computing a third memory address associated with the object located in the second page, and writing to the second page a third fixup record for indexing the third memory address. In this case, the second fixup record is computed based on the first fixup record, and the third fixup record is computed based on the second fixup record, i.e., the fixup records are chained, thereby significantly reducing the overall size of the file by reducing the collective size of all of the records. The fixup records are created by computing page offset values and object offset values.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DESCRIPTION OF THE PREFERRED EMBODIMENT

Figure 1:
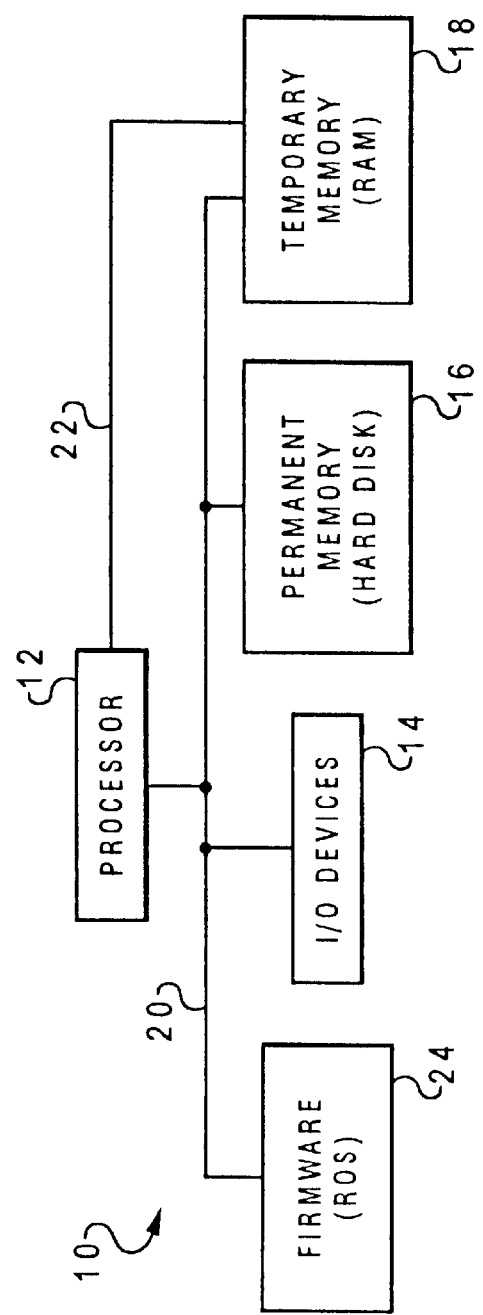
FIG. 1 is a block diagram of a conventional computer system.
Figure 2:
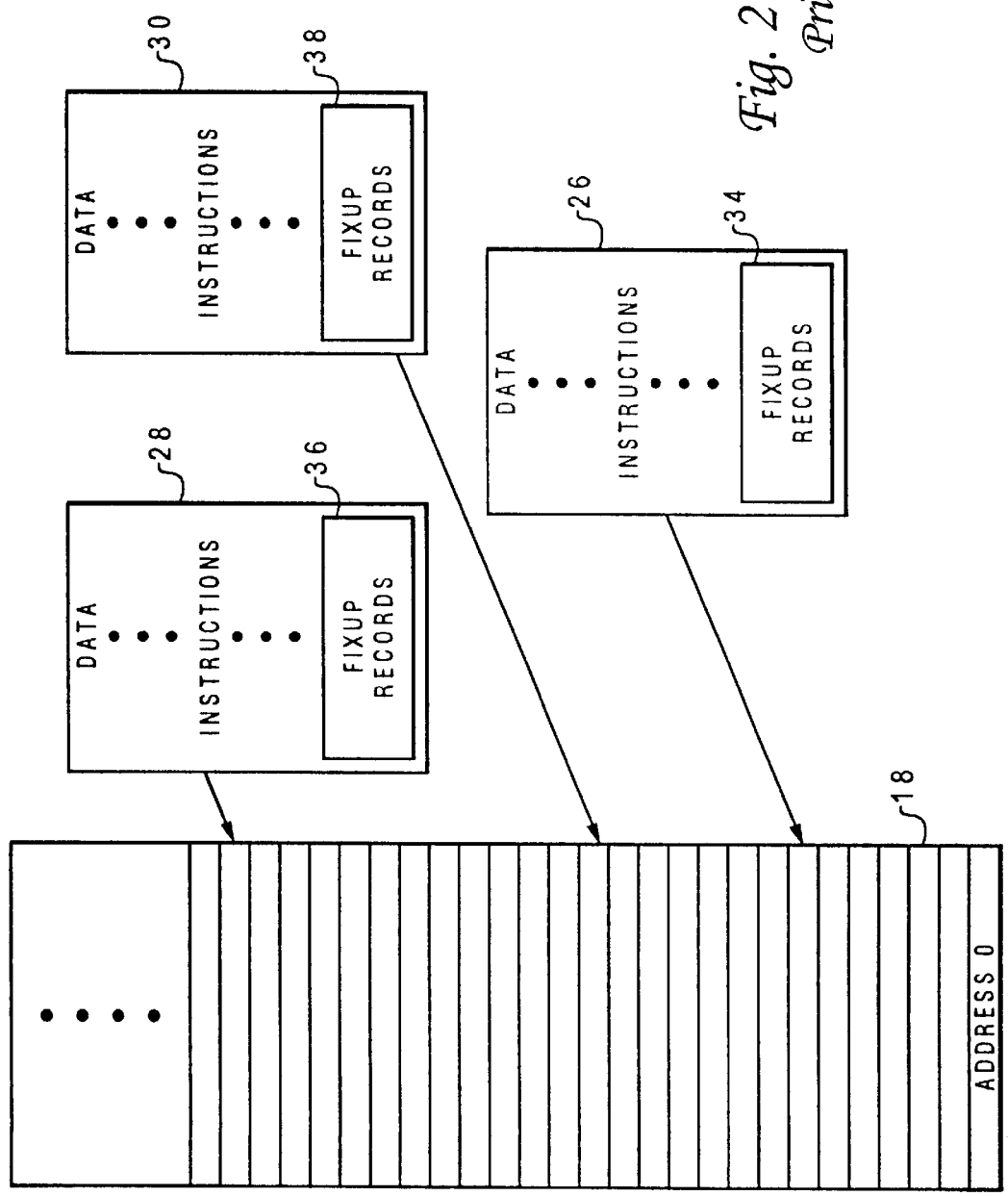
FIG. 2 is a representation of a prior art method of loading executable files and dynamically linked libraries having fixup records.

The present invention is directed to a method of indexing memory addresses in a computer program file adapted to run on a computer system. The computer system's hardware may include the various components shown in FIG. 1, but the computer system is not necessarily conventional, i.e., it could include new hardware components as well, or have a novel interconnection architecture for existing components. Therefore, while the present invention may be understood with reference to FIG. 1, this reference should not be construed in a limiting sense.

Figure 3:
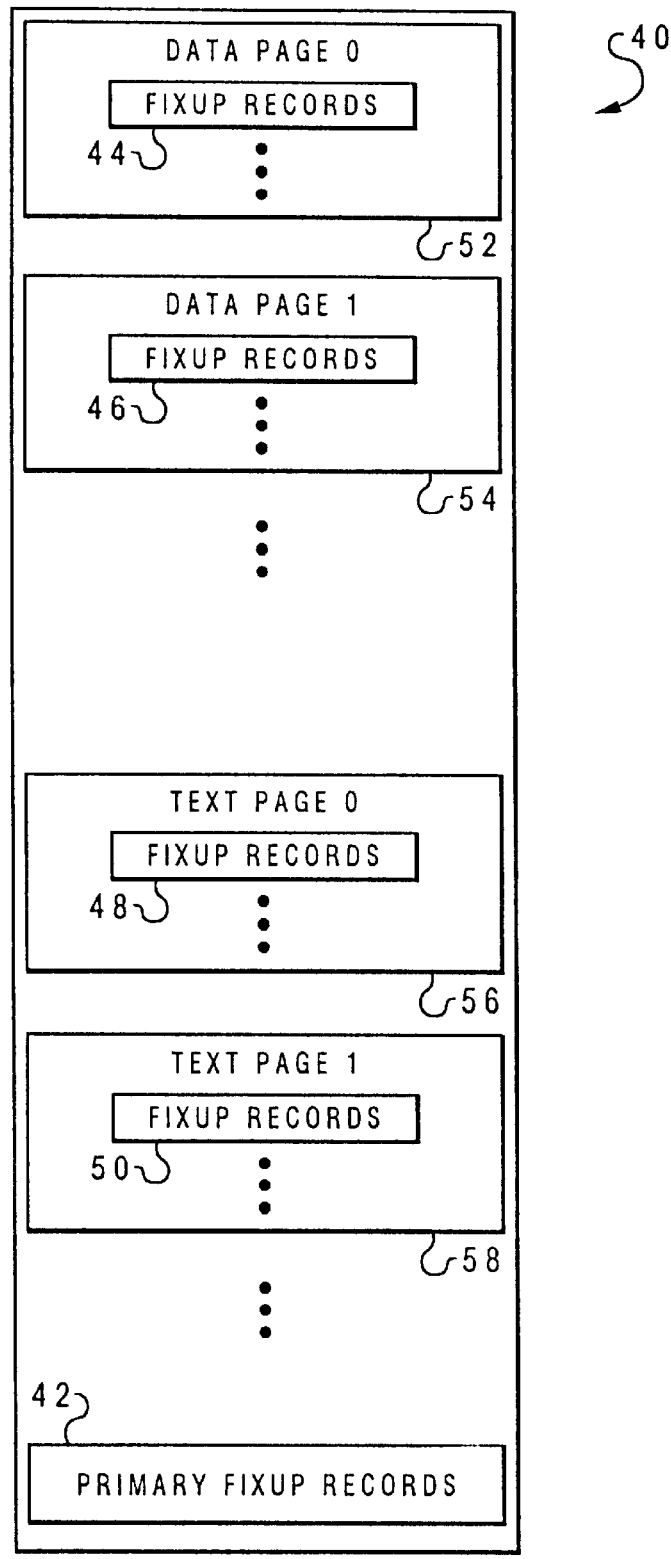
FIG. 3 is a representation of one embodiment of a computer file constructed in accordance with the present invention, having multiple fixup records located in text and data pages within the file.

With reference now to FIG. 3, there is depicted a representation of one embodiment of a computer file 40 constructed in accordance with the present invention. File 40, which may be an executable file or another loadable (LX) file such as a dynamically linked library, has multiple fixup records, including a primary fixup record 42 and other fixup records 44, 46, 48 and 50 located in respective data and text pages 52, 54, 56 and 58 defined within file 40. As explained further below, these fixup records are successively created, or chained, in a manner that significantly reduces the overall amount of file space associated with the fixup records. It is understood that while only four pages are shown in FIG. 3, there could be many more pages, each having an associated fixup record. Also, it is not necessary to provide a fixup record in each page of the file, but those skilled in the art will appreciate that by doing this, the technique is optimized to reduce the size of the fixup records.

Figure 4:
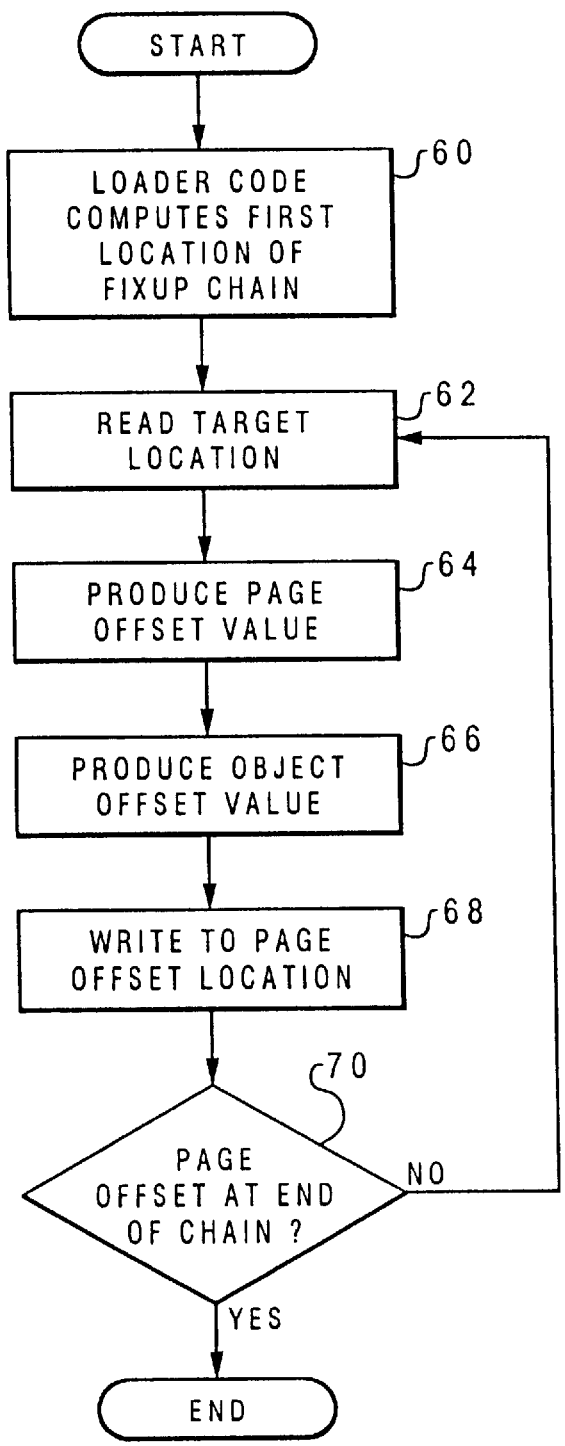
FIG. 4 is a flow chart depicting a method of chaining internal fixup records according to the present invention.

FIG. 4 depicts one method of implementing the fixup record chaining technique of the present invention. The address to write at the first location on the chain is computed in a conventional manner, using existing loader code (60). Before writing this fixed address to the target location, however, the contents (32 bits) from the target location are read into a temporary variable, hereinafter referred to as "X" (62). By combining this variable X in an AND operation with an appropriate value (0xFFF00000 in the case of a 32 bit address having two segments—a 12 bit segment and a 20 bit segment) and shifting the resulting value to the right (by 20 bits), a page offset is produced where the next fixup on the internal chain is to be applied (64). Taking this value, and further combining it by another AND operation with another value (0x000FFFFF) produces the object offset value (66). This value, in conjunction with the value computed for the first address on the chain, will be written to the page offset location (68). Steps 62 through 68 are then repeated for each object in the page until a page offset corresponding to the end of the chain (0xFFF) is found (70).

By storing the bulk of the internal fixup information within the actual text and data pages, a 4 KB page may contain information the loader can use to determine what bytes within that same page need to be fixed up. With the bulk of the data contained within the 4 KB page, 70% to 90% fewer bytes are needed within the LX file's fixup section. This approach speeds up load time, because less has to be read in, and the approach reduces the overall system working set, because the structures to index are smaller in size.

This technique may be applied to all DLL files associated with a particular product (program), or a subset of the DLL files. For example, if the present invention is applied to the files required for booting the WARP™ operating system marketed by International Business Machines Corp (IBM), the total savings in file size exceeds 2 megabytes (MB). The total savings in fixup records read into memory also exceeds 2 MB. Furthermore, a 10% improvement in system responsiveness tests was observed as well as a 15% to 20% reduction in boot time. Basing can still be provided for any DLL files as desired (e.g., one or two system files), and the internal chaining technique of the present invention used for other DLLs, because the technique saves considerable RAM and hard disk space and is more flexible than basing.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A method of indexing a plurality of memory addresses associated with objects in a computer program file, comprising the steps of:

defining at least a first page in the program file, the page including at least two objects;

computing a first memory address associated with a first object located in the page;

writing to the file a first fixup record for indexing the first memory address of the first object;

computing a second memory address associated with a second object located in the page; and writing to the page a second fixup record for indexing the second memory address of the second object.

2. The method of claim 1 wherein the second fixup record is computed based on the first fixup record.

3. The method of claim 1 wherein the first fixup record is created by producing a page offset value.

4. The method of claim 1 further comprising the steps of:

defining a second page in the program file, the second page having at least one object;

computing a third memory address associated with the object located in the second page;

writing to the second page a third fixup record for indexing the third memory address.

5. The method of claim 3 wherein the first fixup is created by further producing an object offset value.

6. The method of claim 4 wherein:

the second fixup record is computed based on the first fixup record; and the third fixup record is computed based on the second fixup record.

7. A method of indexing a plurality of memory addresses associated with objects in a computer program file, comprising the steps of:

defining at least two pages in the program file, a first one of the pages including at least first and second objects, and a second one of the pages including at least third and fourth objects;

computing a first memory address associated with the first object;

writing to the file a primary fixup record for indexing the first memory address;

computing a second memory address associated with the second object;

writing to the first page a first page fixup record for indexing the second memory address;

computing a third memory address associated with the third object; writing to the second page a second page fixup record for indexing the third memory address;

computing a fourth memory address associated with the fourth object; and writing to the second page a third page fixup record for indexing the fourth memory address.

8. The method of claim 7 wherein each of the page fixup records are created by producing respective page offset values.

9. The method of claim 7 wherein:

the first page fixup record is computed based on the primary fixup record;

the second page fixup record is computed based on the first page fixup record; and the third page fixup record is computed based on the second page fixup record.

10. An article of manufacture comprising:

a recordable media; and a program file recorded on said media, said program file having at least a first page, said page including at least first and second objects, said program file further having a primary fixup record for indexing a first memory address associated with said first object, and said page further having a first page fixup record for indexing a second memory address associated with said second object.

11. The article of claim 10 wherein said page fixup record is computed based on said primary fixup record.

12. The article of claim 10 wherein:

said program file further has a second page;

said second page has at least third and fourth objects; and said second page further has a second page fixup record for indexing a third memory address associated with said third object, and a third page fixup record for indexing a fourth memory address associated with said fourth object.

13. The article of claim 12 wherein:

said first page fixup record is computed based on said primary fixup record;

said second page fixup record is computed based on said first page fixup record; and said third page fixup record is computed based on said second page fixup record.

* * * * *